United States Patent [19]

Lanier et al.

[11] Patent Number: 5,588,104

[45] Date of Patent: Dec. 24, 1996

[54] METHOD AND APPARATUS FOR CREATING VIRTUAL WORLDS USING A DATA FLOW NETWORK

[75] Inventors: Jaron Z. Lanier, Palo Alto; Ann Lasko-Harvill, San Mateo; Chuck L. Blanchard, Palo Alto; Joe L. Sparks, San Francisco, all of Calif.

[73] Assignee: VPL Research, Inc., Redwood City, Calif.

[21] Appl. No.: 317,341

[22] Filed: Oct. 4, 1994

Related U.S. Application Data

[63] Continuation of Ser. No. 931,881, Aug. 13, 1992, abandoned, which is a continuation of Ser. No. 620,490, Nov. 30, 1990, abandoned.

[51] Int. Cl.⁶ .................................................. G06T 17/00
[52] U.S. Cl. .................................................. 395/326
[58] Field of Search .................................. 395/119, 152, 395/155, 161, 500, 700, 800; 364/188, 190, 191, 192, 193, 189

[56] References Cited

U.S. PATENT DOCUMENTS

| | | | |
|---|---|---|---|
| 4,315,315 | 2/1982 | Kossiakoff | 395/700 |
| 4,914,568 | 4/1990 | Kodosky et al. | 395/275 |
| 4,974,174 | 11/1990 | Kleinman | 395/133 |
| 5,237,647 | 8/1993 | Roberts et al. | 395/119 |
| 5,319,747 | 6/1994 | Gerrissen et al. | 395/152 |
| 5,396,265 | 3/1995 | Ulrich et al. | 364/474.24 |

*Primary Examiner*—Richard L. Ellis
*Attorney, Agent, or Firm*—Oblon, Spivak, McClelland, Maier & Neustadt, P.C.

[57] ABSTRACT

A computer display displays a data flow network as a plurality of interconnected units. An interactive program allows the appearance of the plurality of interconnected units to be changed. The data flow network then is automatically altered to correspond with the visual changes. The interconnected units of the data flow network represent inputs, functions and outputs of the data flow network. Inputs represent control signals to manipulate the data flow network, functions modify the value of inputs according to the type of the function unit and outputs represent the x, y or z value of a point in a three-dimensional coordinate system of the virtual world.

42 Claims, 4 Drawing Sheets

METHOD AND APPARATUS FOR CREATING VIRTUAL WORLDS USING A DATA FLOW NETWORK

This is a Continuation of U.S. patent application Ser. No. 07/931,881 filed on Aug. 13, 1992, now abandoned, which was a Continuation of U.S. patent application Ser. No. 07/620,490 filed on Nov. 30, 1990, now abandoned.

BACKGROUND OF THE INVENTION

This invention relates to virtual reality systems and, more particularly, to a method and apparatus for creating a virtual world.

Users of computer systems are now able to create virtual realities which they may view and interact with. One type of virtual reality system is disclosed in U.S. patent application Ser. No. 535,253, filed Jun. 7, 1990, entitled "Virtual Reality Network," the disclosure of which is incorporated herein by reference. One task which must be performed is the creation of the virtual worlds within which the users interact. This can be a very tedious task, since a complete description of all virtual objects in the virtual world, including their constraints of motion, hierarchy, color, texture and other attributes must be made and entered into the virtual reality computer. Thus, it is desirable to make virtual world creation as simple as possible.

One product used to create virtual worlds is the "Body Electric" program discussed in the above-identified patent application. The Body Electric program allows the user to create virtual world hierarchy trees and to couple data (real world or synthesized) to the tree nodes.

SUMMARY OF THE INVENTION

The present invention is directed to an improved method and apparatus for creating virtual worlds wherein users may manipulate pictorial objects on a computer screen to effect complicated operations on the virtual world database. In one embodiment of the present invention, a computer display displays a data flow network as a plurality of interconnected units. An interactive program allows the appearance of the plurality of interconnected units to be changed. The data flow network then is automatically altered to correspond with the visual changes.

DESCRIPTION OF PREFERRED EMBODIMENTS

Figure 1:
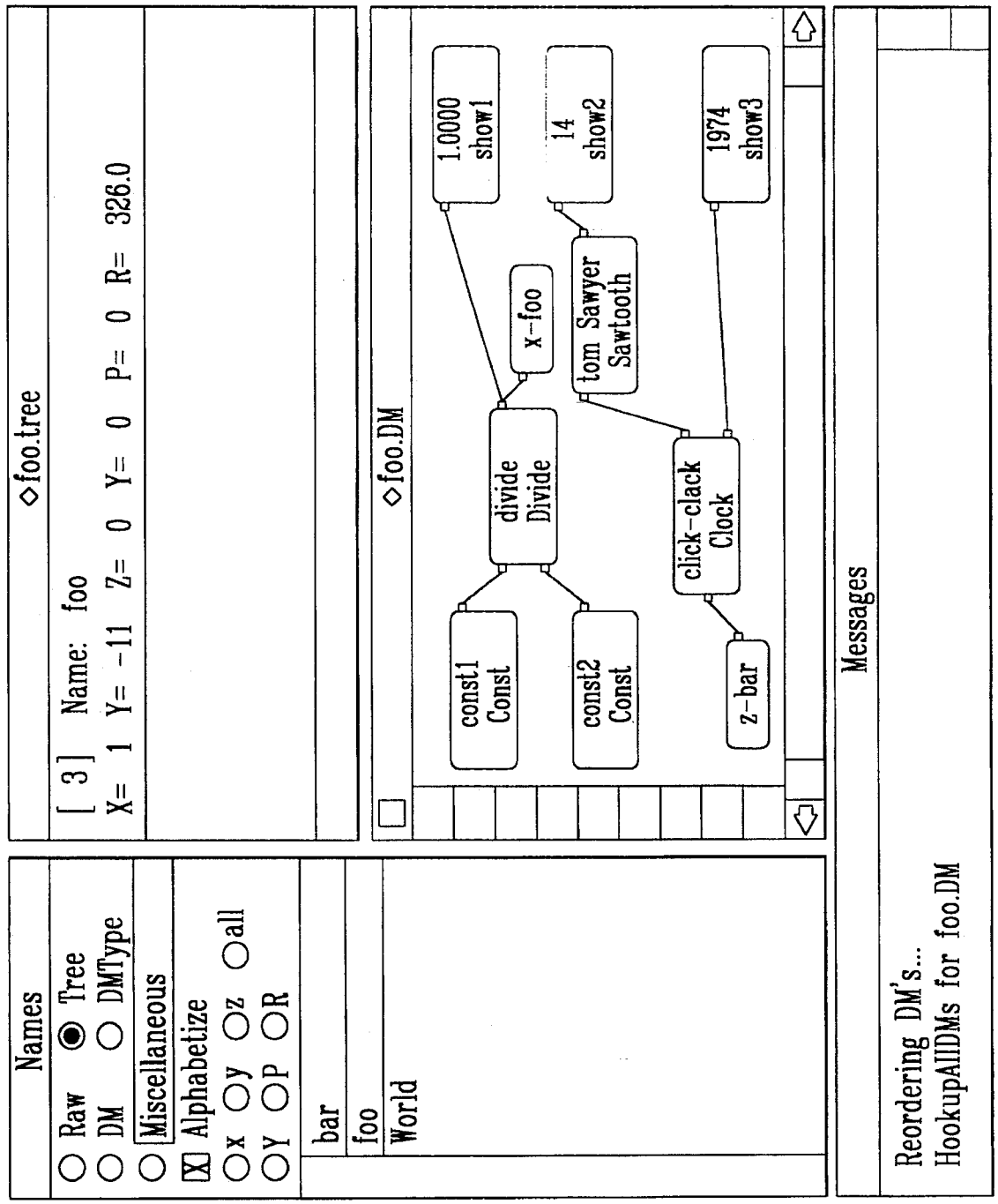
FIG. 1 is a diagram of a display screen which incorporates features according to the present invention.

Referring now to the drawings, wherein like reference numerals designate identical or corresponding parts throughout the several views, and more particularly to FIG. 1 thereof. FIG. 1 illustrates an embodiment of the current invention using a Macintosh computer and multiple windows on the Macintosh display. The window in the upper left-hand corner shows a box allowing the user to choose what types of units will be displayed in the selection box in the lower left-hand corner. The window in the upper right-hand corner shows a point in the tree hierarchy and its orientation, while the lower right-hand corner illustrates a data flow network with multiple input, function and output units.

Figure 2:
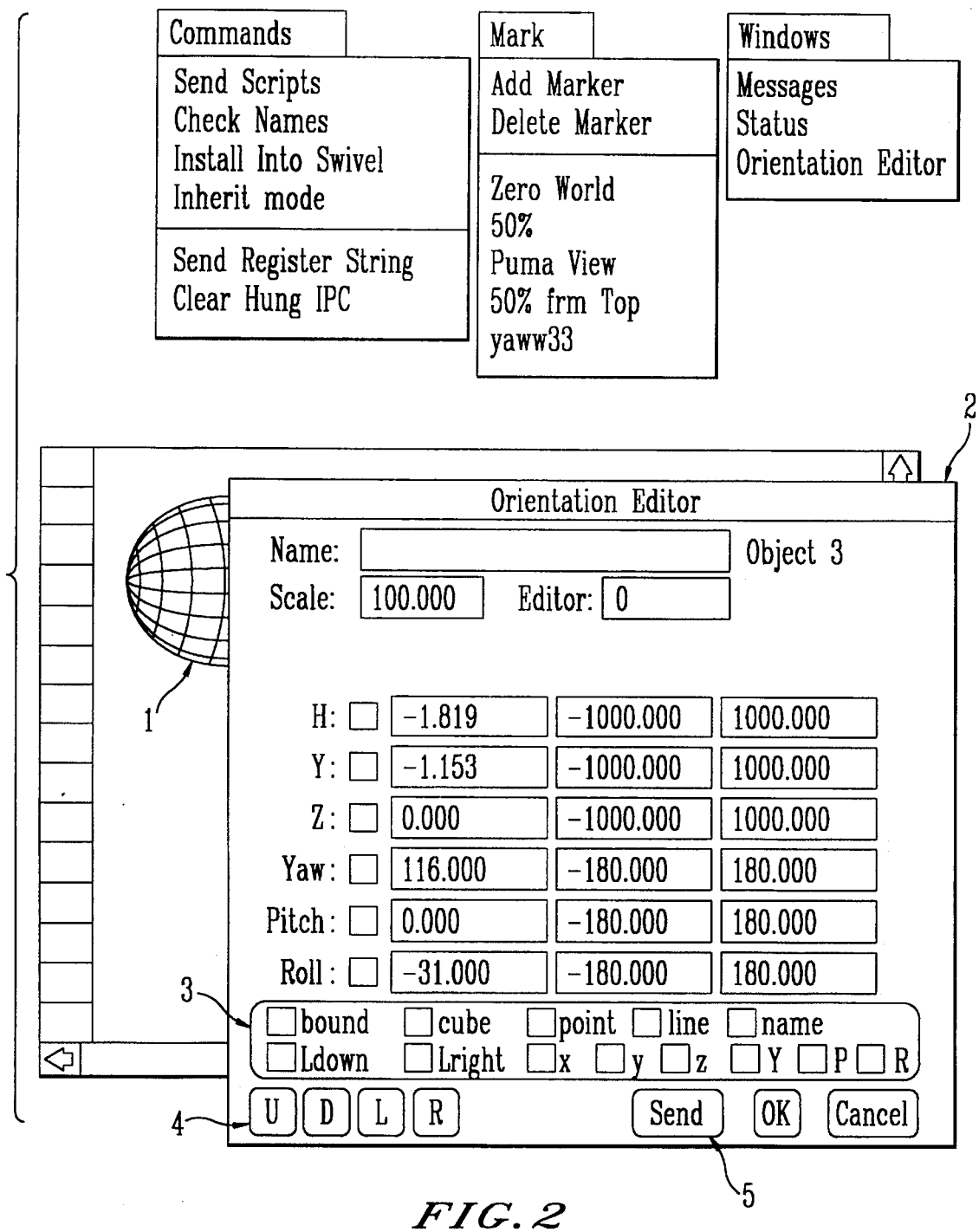
FIG. 2 is a diagram of a display screen which incorporates interprocessor communication features according to the present invention.

FIG. 2 shows a rendering of a hierarchical model of a sphere 1. The structure of the model is being edited graphically with an Orientation Editor 2 so as to change a characteristic of a point in the hierarchy. Attributes of a point to be charged can be selected through a series of check boxes 3. The point hierarchy can be traversed using the traversal buttons 4, and the results can be submitted back to the model renderer using the send button 5.

Figure 3:
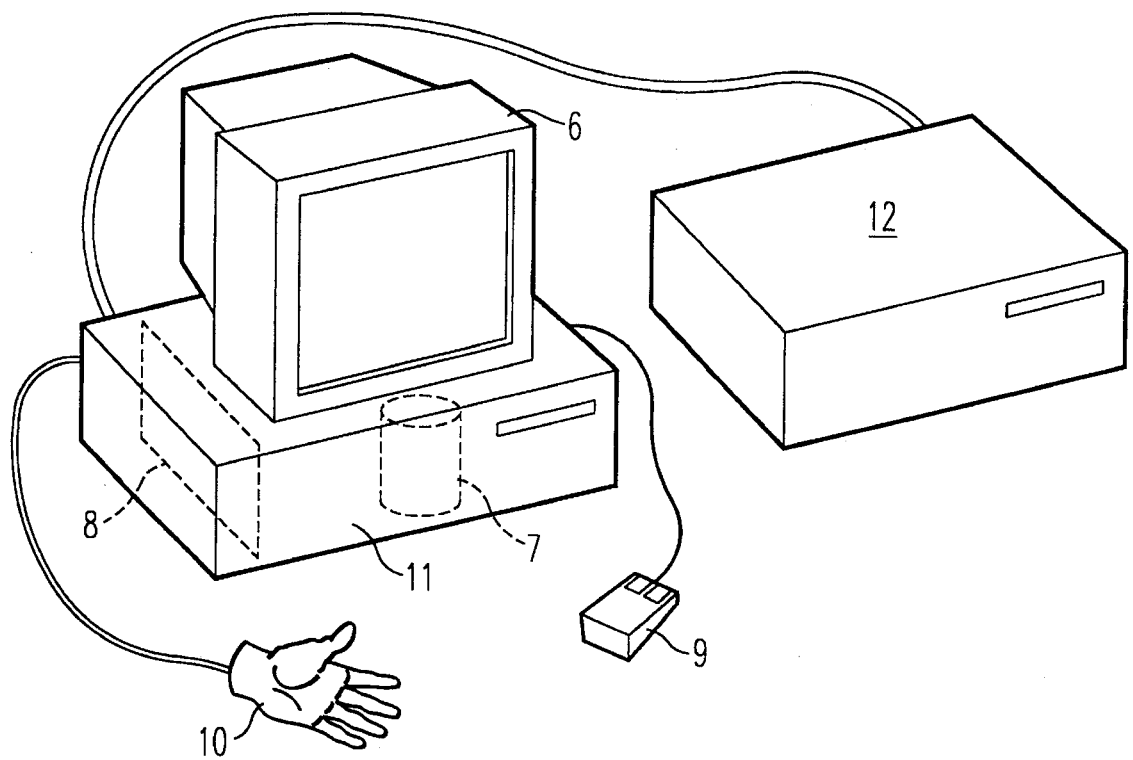
FIG. 3 is a schematic of an exemplary system according to the present invention which is capable of performing the method of the present invention.

FIG. 3 shows a Macintosh computer 11 attached to a computer display 6 and being used as a means for generating and altering a data flow network, a point hierarchy, and the graphical representation of the points in a three-dimensional coordinate system. In addition, FIG. 3 depicts several possible input devices whose values can be sampled. The digital storage device 7, analog-to-digital converter card 8, mouse 9, glove 10 and other computer 12 all can be data inputs to the system.

Figure 4:
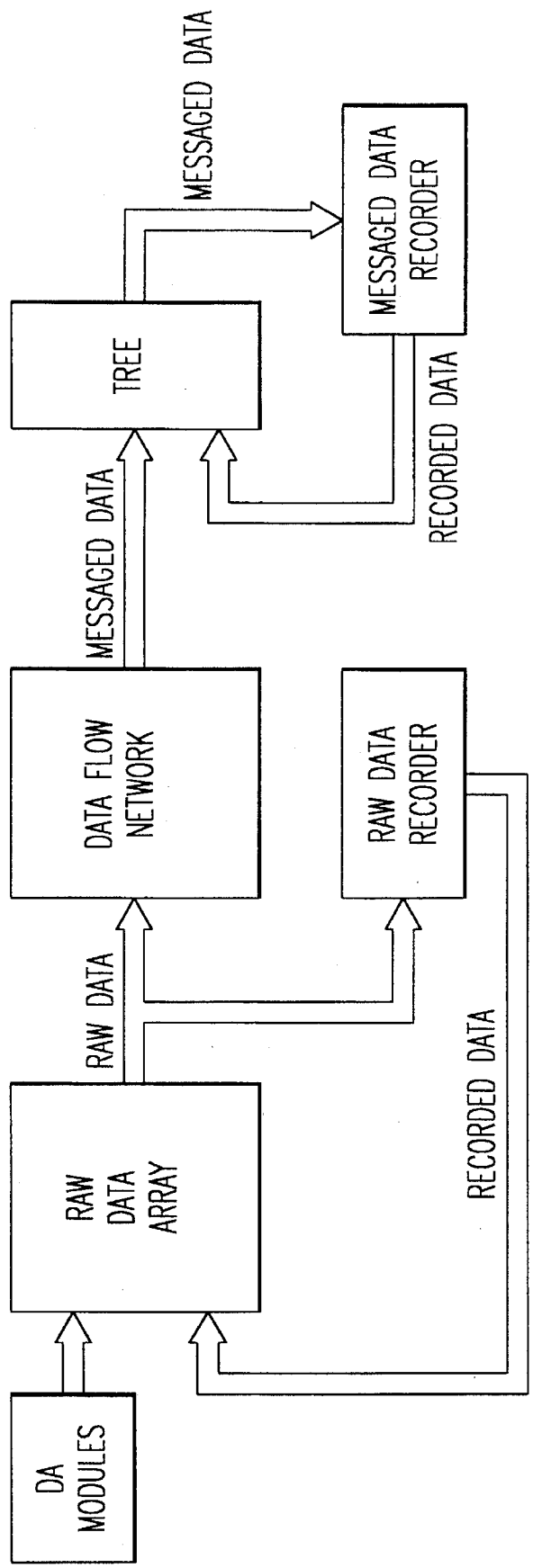
FIG. 4 is a schematic showing the overall flow of data in the network from the DA modules to the rendered tree.

FIG. 4 shows a generalized flow diagram in which DA modules receive data from external devices and pass the sampled data to the Raw Data Array. This raw data from the Raw Data Array can be recorded by the raw data recorder and passed to the data flow network. The data flow network massages the raw data into massaged data which is passed on to the tree rendering means housed in computer 11. In addition, the massaged data can be recorded by the massaged data recorder and fed back to the tree rendering means housed in computer 12 to further animate the tree.

This invention provides a novel apparatus for creating virtual worlds where users may manipulate pictorial objects on a computer display to effect complicated operations on the elements of the virtual worlds. In this embodiment of the present invention, a computer display attached to a specially programmed digital computer displays two different graphs; the first is a hierarchically defined set of points that make up an object or a set of objects in terms of their relative positions. The second graph is a data flow network represented as a plurality of interconnected units.

To define an object in a virtual world, the points that represent edges or vertices of an object must be defined in terms of their positions in space. To speed calculation of points in a virtual world, points are defined relative to other known points. This relative definition of points leads to a hierarchy of points. The upper-most point in the hierarchy is labeled "the world" and corresponds to a location in physical space as opposed to virtual space. All other points in the next lower level of the hierarchy are defined relative to this global reference. These points are in turn used for a subsequently lower level of points, with each higher level being the "parents" for the lower level. When defining a point's relationship to its parent point, the relation is defined in terms of the point's relative x, y, z position as well as its yaw, pitch and roll. This allows not only the position of a point to be known, but also its orientation compared to its parent.

When this static model has been created, the virtual objects as they are initially defined can be viewed three-dimensionally to determine whether or not the desired structure has been achieved. If not, points or sub-trees of the hierarchy can be moved to create new object representations, with the spatial position of points being automatically updated to reflect the change in hierarchical position. Since all points are defined in three-dimensions, the apparatus is capable of displaying to the user the resulting objects from any angle or distance.

The data flow network is composed of three main types of graphical elements: input, function and output units. An interactive program controls the appearance of the plurality of interconnected units as they are manipulated. The data flow network is then automatically altered to correspond with the visual changes. Input units to the data flow network represent data that correspond to changes in the physical world. Function units represent digital circuits that can transform data from either input units or the output of other function units into new values. Output units represent the link between the data flow network and the graphical representation of the objects in a virtual world. The value of an output corresponds to the relative position of a point in terms of one of the points degrees of freedom: x, y, z, yaw, pitch or roll.

Input units of a system commonly represent external devices like a virtual reality glove or an analog-to-digital converter or other appropriate control mechanisms for interacting with a virtual environment. The present embodiment provides for not only sampling the device, but also for including a calibration means to set a translation function for values sampled from an external device. Depending on the device, samples of each device need not be taken at the same time, so sampling rates are user-definable in the present embodiment.

Input units, however, are not restricted to real-time samples of instruments. To facilitate matching a virtual reality's response to the real world, it is helpful to be able to record a set of inputs and play them back when the data flow network is connected in various ways. In addition, the internal clock of the computer is an important input to the virtual reality system. The clock can act as a periodic input that drives animation of virtual reality worlds, or it can be used to accurately represent how quickly objects move by synchronizing the object's motion to the value of the clock. The clock further allows a means of determining the time at which other input values changed. In order to replay recorded inputs, time-stamps must also be stored with the input data so as to maintain input synchronization. To further speed the processing of input changes, modifications to input states can also be defined in terms of changes to only those degrees of freedom that have changed since the last sample was received, and may be stored on a digital medium as such.

Function units have zero or more inputs, one or more outputs and describe the operations to be performed on the inputs to provide a result at the outputs. Three examples will help illustrate the role of function units. An example of a function unit with no inputs is a constant value. Its output may be used as an input to another function unit, like an addition unit. An addition unit takes its two inputs and provides their sum as its only output. A sorter unit, however, has two inputs and two outputs and always presents the greater value on the first output and the smaller value on the second output.

Output units are different than the outputs of function units. Each output unit describes part of the relative relationship of point to another point in terms of x, y, z, yaw, pitch or roll. The point represented by an output unit can either be a single point or the center point of a polygon defined by the orientation of the center point.

To create a description of the contents and behavior of a virtual world, the user combines available input, function and output units into a network of interconnected units. Using graphical representations of each unit, the user connects input units to function units, function units to each other, and function units to output units, thus creating a directed graph. This method has an inherent advantage over manually entering constraints independently for each point in that the current system is capable of changing many units automatically by changing or adding function units earlier in the graph. The resulting change is propagated to all units below the change, thus saving the work of redescribing the constraints for individual units.

Several other features ease the creation of virtual worlds. To facilitate manipulating input, function and output units, the present invention enables each unit to be named and will search for and display the named unit when requested. When taking a group of units and replicating them for use in a different part of the network, the present embodiment will initially provide each replicated element with a default name so as to prevent assigning multiple elements the same name.

The combination of elements in an interconnection can be very involved, so several features attempt to address this problem. Since the interconnection uses lines to depict data being moved from input units to function units and from function units to output units, a data flow network can become crowded with crossing lines. A useful feature, therefore, allows the user to hide lines to or from any unit. The network can be further depicted using only a subset of the interconnection. The user should be able to interactively hide or show elements to aid making the network more understandable.

Furthermore, by allowing the user to group multiple basic units into larger, user-defined units, designs can be built hierarchically, a technique that has been shown in programming to reduce designer burden. In addition, these new units can be stored in the form of an electronic library of elements to allow retrieval later when the same functionality is again required. Taking again from the programming analogy, the present embodiment allows the user to add "comments" or annotations to data flow network to aid in remembering how and why units are connected.

In addition, since the speed of updating the display is important when rendering virtual worlds, the type of each output should be specified. By specifying that an output is an integer and not a floating point number, the means for altering point positions can reduce the time required to determine a new output value, thus calculating more points per time unit and making frame rendering more smooth.

To further aid the user in reducing the time required to define a virtual world, the present embodiment provides several aids to creating properly described worlds. When the user attempts to attach an input to an output of an incompatible type, the user is immediately notified either visually or acoustically. This prevents detection of the error from being delayed until the apparatus is tested, saving the user the time of going back to find the unit and correct the problem.

The apparatus is further capable of allowing a user to disable all of a units outputs. Users can choose to do this to freeze a point in space or to reduce the number of calculations per frame, thus increasing frame rates.

Once an apparatus has been used to define a data flow network and a hierarchy of points that define the virtual world, the virtual world is ready to be simulated. The apparatus can be commanded to begin to sample data from the input units specified in the data flow network and send the data through the function units. As the input values change, the output values affected by the changing input also change correspondingly. These changes effect changes in points below the changed point in the point hierarchy, thus changing the relative positions of points that make up the virtual world. It is these changes that cause the virtual reality objects to move on the graphics display and provide the illusion that the user is interacting with the virtual world.

Obviously, numerous modifications and variations of the present invention are possible in light of the above teachings. It is therefore to be understood that within the scope of the appended claims, the invention may be practiced otherwise than as specifically described herein.

What is claimed is:

1. An apparatus for creating a virtual world, the virtual world including a virtual object which represents a physical object, wherein a first point of the virtual object represents a first part of the physical object and the first point moves in relation to second and third points of the virtual object which represent second and third parts of the physical object, wherein a movement of the first point is based on changes in inputs to a data flow network, the data flow network describing the movement of the first point in relation to the second and third points when the movement of the first point is not based on either one of a rotation and a translation of the virtual object, the apparatus comprising:

a computer display; and means, connected to the computer display, for generating a data flow network for calculating a movement of a first point of a virtual object in a virtual world in relation to a second point and a third point of the virtual object when the movement is not based on either one of a rotation and a translation of the virtual object, the data flow network including a plurality of interconnected units, and the plurality of interconnected units including at least one input unit representing at least one source of input data for providing input data to the data flow network, a plurality of function units which transform the input data, and a plurality of output units each representing one dimension of a corresponding vector of the first point in a three-dimensional coordinate system, wherein the corresponding vector of the first point generates a first spatial position and a first orientation of the first point in the three-dimensional coordinate system in the virtual world.

2. The apparatus of claim 1, further comprising means for generating a point hierarchy including the first, second and third points, the first point having a first hierarchical position, the second point having a second hierarchical position and a second spatial position, and the third point having a third hierarchical position and a third spatial position, wherein said second hierarchical position is higher in the point hierarchy than said third hierarchical position and wherein said third spatial position is derived from said second spatial position.

3. The apparatus of claim 2, further comprising:

means for altering said first spatial position of the first point in response to changes in the input data.

4. The apparatus of claim 3, further comprising:

means for altering said third spatial position in response to a change in said second spatial position.

5. The apparatus of claim 4, wherein at least one of said plurality of function units has a first output and a first user-definable type representation.

6. The apparatus of claim 5, wherein:

at least one of said plurality of input units has a first input and a second user-definable type representation; and said apparatus further comprises a means for checking that said first user-definable type representation is compatible with said second user-definable type representation before said first output and said first input are connected.

7. The apparatus of claim 6, further comprising:

means for visually notifying a user of a type representation incompatibility between said first output and said first input.

8. The apparatus of claim 6, further comprising:

means for acoustically notifying a user of a type representation incompatibility between said first output and said first input.

9. The apparatus of claim 4, wherein said computer display comprises means for graphically rendering said first and second spatial positions in the three-dimensional coordinate system of the virtual world.

10. The apparatus of claim 9, further comprising:

means for altering said first spatial position in response to changes in said first hierarchical position.

11. The apparatus of claim 9, further comprising:

means for a user to specify an angle from which said points are viewed.

12. The apparatus of claim 4, further comprising:

means for reading the input data from a digital storage device.

13. The apparatus of claim 4, further comprising:

means for sampling the input data from an external device.

14. The apparatus of claim 13, wherein said external device is a data glove.

15. The apparatus of claim 13, wherein said external device is an analog-to-digital converter.

16. The apparatus of claim 13, wherein said external device is a computer.

17. The apparatus of claim 13, wherein said external device is an electronic mouse.

18. The apparatus of claim 13, further comprising:

means for calibrating positions of said external device.

19. The apparatus of claim 13, further comprising:

a digital storage device; and a means for writing the input data sampled by the means for sampling to the digital storage device.

20. The apparatus of claim 19, wherein the means for writing also writes time-stamps with the input data to the digital storage device.

21. The apparatus of claim 20, further comprising:

means for preprocessing the input data before the means for writing writes the input data and the time-stamps to the digital storage device.

22. The apparatus of claim 13, wherein the means for sampling samples at a user-definable period.

23. The apparatus of claim 4, wherein said at least one source of input data inputs said input data which includes position values in x, y, z, yaw, pitch and roll.

24. The apparatus of claim 4, wherein said at least one source of input data inputs said input data which includes changes in position values in x, y, z, yaw, pitch and roll.

25. The apparatus of claim 4, further comprising:

means for visually notifying to a user that at least one of said plurality of said function units has outputs not used by any of said plurality of said function units.

26. The apparatus of claim 4, further comprising:

means for individually displaying and hiding said function units as requested by a user.

27. The apparatus of claim 4, further comprising:

means for adding user notations to the data flow network.

28. The apparatus of claim 4, wherein said means for generating a data flow network further comprises a means for generating a name for one of said plurality of interconnected units;

wherein said apparatus further comprises a selecting means for selecting, as a named unit, said one of said plurality of interconnected units for which a name was generated by specifying a name that corresponds to said named unit; and wherein said computer display displays a graphical representation of said named unit.

29. The apparatus of claim 28, further comprising:

means for automatically naming modules without user intervention.

30. The apparatus of claim 4, further comprising:

means for combining a plurality of function units into a new single function unit.

31. The apparatus of claim 4, further comprising:

means for individually displaying and hiding an interconnection line between two function units.

32. The apparatus of claim 4, further comprising:

a display separate from said computer display, including means for graphically rendering said first and second spatial positions in the three-dimensional coordinate system of the virtual world.

33. The apparatus of claim 1, wherein the first point represents a center point of an N-dimensional polygon.

34. The apparatus of claim 1, further comprising:

means for altering said data flow network.

35. The apparatus of claim 34, wherein the means for altering said data flow network comprises:

means for manipulating a graphical representation of said data flow network; and means for changing which of said plurality of said function units are interconnected in response to manipulations of the graphical representation of said data flow network.

36. The apparatus of claim 34, wherein the means for altering said data flow network comprises:

means for receiving a textual description of changes to be made to said data flow network; and means for changing which of said plurality of said function units are interconnected based on the received textual description of changes to be made.

37. The apparatus of claim 2, further comprising:

means for designating one of said first and second points as a root of a sub-tree in the point hierarchy; and means for scaling corresponding spatial positions of points in the sub-tree in x, y and z dimensions.

38. A method for creating a virtual world, the virtual world including a virtual object which represents a physical object, wherein a first point of the virtual object represents a first part of the physical object and the first point moves in relation to second and third points of the virtual object which represent second and third parts of the physical object, wherein a movement of the first point is based on changes in inputs to a data flow network, the data flow network describing the movement of the first point in relation to the second and third points when the movement of the first point is not based on either one of a rotation and a translation of the virtual object, the method comprising the steps of:

generating a data flow network for calculating a movement of a first point of a virtual object in a virtual world in relation to a second point and a third point of the virtual object when the movement is not based on either one of a rotation and a translation of the virtual object, the data flow network including a plurality of interconnected units, and the plurality of interconnected units including at least one input unit representing at least one source of input data for providing input data to the data flow network, a plurality of function units which transform the input data, and a plurality of output units each representing one dimension of a corresponding vector of the first point in a three-dimensional coordinate system, wherein the corresponding vector of the first point generates a first spatial position and a first orientation of the first point in the three-dimensional coordinate system in the virtual world; and calibrating said at least one source of input data to restrict said input data to a corresponding range.

39. The method of claim 38, further comprising the steps of:

generating a point hierarchy including said first, second and third points, said first point having a first hierarchical position, said second point having a second hierarchical position and a second spatial position, and said third point having a third hierarchical position and a third spatial position;

generating relative hierarchical point positions for said second and third points wherein said second hierarchical position is higher in the point hierarchy than said third hierarchical position; and calculating said third spatial position as a function of said second spatial position.

40. The method of claim 39, further comprising the steps of:

sampling the at least one source of input data for changes in the input data provided to the data flow network from the at least one source of input data; and altering said first spatial position in response to said changes in the input data provided to the data flow network from the at least one source of input data.

41. The method of claim 40, further comprising the step of:

altering said third spatial position in response to changes in said second spatial position.

42. The method of claim 41, further comprising the step of:

displaying said first, second and third spatial positions in the three-dimensional coordinate system in the virtual world.

\* \* \* \* \*